United States Patent
Tatsuno (10) Patent No.: US 8,614,413 B2
(45) Date of Patent: Dec. 24, 2013

(54) IMAGE READING APPARATUS TO ILLUMINATE LIGHT ON AN ORIGINAL DOCUMENT WITH AN OPTICAL MEMBER HAVING FOUR PLANES POSITIONED SUCH THAT THE LIGHT INCIDENT SIDE IS SMALLER IN SIZE THAN THE LIGHT EXIT SIDE

(75) Inventor: Hibiki Tatsuno, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 485 days.

(21) Appl. No.: 12/010,398

(22) Filed: Jan. 24, 2008

(65) Prior Publication Data

US 2008/0180774 A1 Jul. 31, 2008

(30) Foreign Application Priority Data

Jan. 31, 2007 (JP) ................................. 2007-021630
Mar. 30, 2007 (JP) ................................. 2007-092343

(51) Int. Cl.
*H01J 3/14* (2006.01)
*H04N 1/04* (2006.01)

(52) U.S. Cl.
USPC .......................................... 250/216; 358/484

(58) Field of Classification Search
USPC ............. 250/234–236, 239, 206, 216, 208.1;
358/471, 480, 482, 483, 484, 475, 296,
358/302; 355/18, 44, 45, 67, 133, 55;
362/606, 608, 609, 610, 613, 615, 617,
362/618, 619, 621, 622, 623, 628, 629, 223,
362/555
See application file for complete search history.

(56) References Cited

U.S. PATENT DOCUMENTS

| | | | |
|---|---|---|---|
| 4,473,865 A * | 9/1984 | Landa | 362/6 |
| 5,255,116 A | 10/1993 | Araki et al. | |
| 5,287,147 A * | 2/1994 | Fukasawa et al. | 399/211 |
| 6,547,400 B1 * | 4/2003 | Yokoyama | 353/98 |
| 6,556,858 B1 * | 4/2003 | Zeman | 600/473 |
| 7,742,202 B2 * | 6/2010 | Higashitani | 358/484 |
| 2005/0088707 A1 * | 4/2005 | Sakurai et al. | 358/475 |
| 2005/0135840 A1 * | 6/2005 | Sakurai et al. | 399/211 |
| 2005/0195452 A1 * | 9/2005 | Tatsuno | 358/509 |
| 2006/0044795 A1 | 3/2006 | Tatsuno | |
| 2007/0024977 A1 | 2/2007 | Kawamura et al. | |
| 2007/0297170 A1 | 12/2007 | Tatsuno | |

FOREIGN PATENT DOCUMENTS

| | | |
|---|---|---|
| JP | 56-106257 | 8/1981 |
| JP | 05-11363 | 1/1993 |
| JP | 2693098 | 9/1997 |
| JP | 2004-361425 | 12/2004 |
| JP | 2005-241681 | 9/2005 |
| JP | 2006067551 A * | 3/2006 |

* cited by examiner

*Primary Examiner* — Que T Le
*Assistant Examiner* — Jennifer Bennett
(74) *Attorney, Agent, or Firm* — Dickstein Shapiro LLP (57) ABSTRACT

An image reading apparatus includes a light source that illuminates light on an original document surface, an optical illumination system that leads the light emitted from the light source towards a reading target region, an imaging optical system that images the light reflected from the original document surface, the image optical system, and a sensor provided in an imaging part of the imaging optical system, for reading an image of an original document on the original document surface. The optical illumination system comprises an optical member and a plurality of reflective members, and an area for disposing the members of the illumination optical system is divided into two areas by a virtual plane perpendicular to the original document surface, parallel to the length direction, and passing through the area for disposing the members, and at least one of the reflective members is disposed in each of the areas.

9 Claims, 10 Drawing Sheets

IMAGE READING APPARATUS TO ILLUMINATE LIGHT ON AN ORIGINAL DOCUMENT WITH AN OPTICAL MEMBER HAVING FOUR PLANES POSITIONED SUCH THAT THE LIGHT INCIDENT SIDE IS SMALLER IN SIZE THAN THE LIGHT EXIT SIDE

PRIORITY CLAIM

This application claims priorities from Japanese Patent Application No. 2007-021630, filed with the Japanese Patent Office on Jan. 31, 2007 and Japanese Patent Application No. 2007-092343, filed with the Japanese Patent Office on Mar. 30, 2007, the contents of which are incorporated herein by reference in their entirety.

BACKGROUND OF THE INVENTION

1. Field of the Invention

The present invention relates to an image reading apparatus for use in a digital copy machine or an image scanner.

2. Description of Related Art

The development of light emitting diode (hereinafter called LED) has been actively conducted in recent years. The brightness of the LED element has rapidly grown. The LED generally has advantages such as longer operating, high efficiency, high anti-G performance, and emission of a single color, so that its application to various fields of illumination is expected. As an application of the LED, the LED is used in image reading apparatuses and original document illumination apparatuses such as digital copiers or image scanners.

As an application of the LED for use in the image reading apparatus, various methods have been proposed. For example, in JP 2005-241681A, a large number of the LEDs is arranged parallel to a main-scanning direction of a surface of an original document, the light emitted from the LEDs is diffused by not providing an optical effect in the main-scanning direction, and the light emitted from the LEDs is concentrated by the concentration effect of a reflective face in a sub-scanning direction, so as to increase the illumination intensity of the reading target area on the surface of the original document.

Moreover, in JP2693098B, light emitted from LEDs is led to the main-scanning direction by repeating the total reflection in a light guide to be diffused and reflected in a diffusion and reflection area, and the light deviated from a total reflection condition is emitted to the outside of the light guide. By way of this, the uniformity of the illumination distribution in the main-scanning diction is increased.

Furthermore, in JP2004-361425A, a large number of LEDs is arranged parallel to a main-scanning direction of an original document, the light emitted from the LEDs is diffused by not providing an optical effect in the main-scanning direction, and the light emitted from the LEDs is concentrated by the concentration effect of a lens in a sub-scanning direction, so as to increase the illumination in the reading target area on the surface of the original document.

However, if an open book or the like is placed on a contact glass (an original document platen), a portion between pages is inevitably raised because of the structure of the book or the like. For this reason, the raised portion between pages forms an angle relative to the contact glass. The entire raised portion having an angle can not be illuminated by the illumination from one direction because a shadow is formed. Accordingly, there is a problem in that a black shadow is read when reading the original document.

Conventionally, as described in JP2004-361425A, with a light source using a cold-cathode tube, illumination from two directions in a first area and a second area is achieved by placing reflection plates opposed to each other. In this case, from a passage of light reflected from the original document and used for imaging, the light source side is defined as a first area and the side opposite to the light source is defined as a second area.

However, in the constitution described in JP2005-241681A, although the light use efficiency can be improved by utilizing the reflective face, the surface of the original document is illuminated only from a first area side. Since the light emitted from the LEDs is concentrated by the reflective surface, even if opposed reflective plates are disposed in a second area, almost no light passes to the opposed reflective plates. For this reason, the illumination from the two directions is practically impossible. If the illumination from the two directions is achieved by lowering the concentration degree, the light use efficiency is severely decreased.

Moreover, in the constitution described in JP2693098B, the light-emitting quantity of the optical illumination system is completely decreased relative to the method of arranging the LEDs because the number of the LEDs which can be provided in one light guide is limited. Therefore, in the constitution described in JP2693098B, it is desirable to provide the optical illumination system in each of the first area and the second area, so as to perform the desired illumination from the two directions, but this generates high costs.

Furthermore, in the constitution described in JP2004-361425A, the size of the entire optical illumination system in a first mirror direction from the surface of the original document surface tends to increase.

SUMMARY OF THE INVENTION

The present invention has been made in view of the above problems. It is, therefore, an object of the present invention to provide an image reading apparatus and an image forming apparatus capable of preventing generation of a shadow portion by raising of a surface of an original document, and also a downsized image reading apparatus and image forming apparatus each having high efficiency of light use which does not lower the light concentration degree.

As a result of the keen examination made by the present inventors, they found that the above problems are solved by constituting an illumination optical system for leading light emitted from a light source to a reading target area of an original document with a plurality of reflective members and an optical member having a light concentration effect, and placing the reflective member in each of the first area and the second area, so as to achieve the illumination from the two directions and the high efficiency of the light use which does not lower the light concentration degree.

More particularly, the image reading apparatus and the image forming apparatus according to the present invention for solving the above problems specifically have technical features described in the following (1) to (19).

(1) An image reading apparatus includes a light source that illuminates light on an original document surface, an optical illumination system that leads the light emitted from the light source towards a reading target region having length and width, an imaging optical system that images the light reflected from the original document surface, the image optical system having an imaging part, and a sensor provided in the imaging part of the imaging optical system, for reading an image of an original document on the original document surface, wherein the optical illumination system includes an optical member having a light concentration effect and a plurality of reflective members, and an area for disposing the members of the illumination optical system is divided into two areas by a virtual plane perpendicular to the original document surface, parallel to the length direction, and passing through the area for disposing the members, and at least one of the plurality of reflective members is disposed in each of the areas.

(2) An image reading apparatus described in the above (1), wherein a light-emitting direction of the light source is parallel to the original document surface, and the light-emitting direction is a direction that light intensity is the strongest within the light emitted from the light source.

(3) An image reading apparatus described in the above (1) or (2), wherein the light source includes a light-emitting diode.

(4) An image reading apparatus described in the above (3), wherein the light-emitting diode is a one chip type white color light-emitting diode using a fluorescent substance.

(5) An image reading apparatus described in the above (3), wherein the light-emitting diode is a white color light-emitting diode that emits a white color by a mixed color by using two or more types of chips each having a different light-emitting color.

(6) An image reading apparatus described in the above (1), wherein the optical member is a lens.

(7) An image reading apparatus described in the above (1), wherein the optical member is a reflective plate of a curved surface form.

(8) An image reading apparatus described in the above (1), wherein the optical member includes a pair of opposed reflective plates, and the pair of opposed reflective plates is arranged to have a distance B between the reflective plates on a side from which the light is emitted larger than a distance A between the reflective plates on a side into which the light enters from the light source.

(9) An image reading apparatus described in the above (8), wherein the reflective plate is in a curved surface shape and the curved surface shape is represented by a parabola formula on a cross-section perpendicular to the length direction, parallel in the width direction and including the light source.

(10) An image reading apparatus described in the above (8), wherein the pair of opposed reflective plates concentrates light diffusing in a perpendicular direction relative to the original document surface within the light emitted from the light source.

(11) An image reading apparatus described in the above (10), wherein the optical member includes on edge parts of the length direction of the pair of opposed reflective plates side reflective plates.

(12) An image reading apparatus described in the above (11), wherein the side reflective plates are disposed to be opposed to each other on the both edge parts of the length direction of the pair of opposed reflective plates, and the pair of opposed side reflective plates is arranged to have a distance D between the side reflective plates on a side from which the light is emitted larger than a distance C between the side reflective plates on a side into which the light enters from the light source.

(13) An image reading apparatus described in the above (12), wherein the pair of opposed side reflective plates concentrates light diffusing in the length direction within the light emitted from the light source.

(14) An image reading apparatus described in the above (1), wherein the optical member is a light guiding body having at least four planes including a glass or an optical plastic, two planes within the four planes are disposed to be opposed to each other, and the two planes disposed to be opposed to each other are arranged to have a distance B' between the planes on a side from which the light is emitted larger than a distance A' between the planes on a side into which the light enters from the light source.

(15) An image reading apparatus described in the above (14), wherein the light guiding body is treated with polishing processing on each plane.

(16) An image reading apparatus described in the above (14), wherein the two planes disposed to be opposed to each other concentrate light diffusing in the perpendicular direction relative to the original document surface within the light emitted from the light source.

(17) An image reading apparatus described in the above (16), wherein the light guiding body has on the edge parts of the length direction of the two planes disposed to be opposed to each other a side plane.

(18) An image reading apparatus described in the above (16), wherein the side planes are disposed to be opposed to each other on the both edge parts of the length direction of the two planes disposed to be opposed to each other, and the pair of opposed side planes is arranged to have a distance D' between the side planes on a side from which the light is emitted larger than a distance C' between the side planes on a side into which the light enters from the light source.

(19) An image reading apparatus described in the above (18), wherein the pair of opposed side planes concentrates light diffusing in the length direction within the light emitted from the light source.

BRIEF DESCRIPTION OF THE DRAWINGS

These and other features, aspects, and advantages of the present invention will become better understood with regard to the following description, appended claims, and accompanying drawings.

DETAILED DESCRIPTION OF THE INVENTION

Basic constitutions of an image forming apparatus and an image reading apparatus according to the present invention will be described hereinbelow. In addition, since the following embodiments are the preferred embodiments of the present invention, technically favorable limitations are applied. However, the present invention is not limited to these embodiments as long as there is no description which particularly limits the scope of the present invention in the following description.

(Image Reading Apparatus)

The image reading apparatus of the present invention includes a light source that illuminates light on a surface of an original document an illumination optical system that leads the light emitted from the light source to a reading target area having length and width, an imaging optical system that images the light reflected from the surface of the original document, and a sensor provided in an imaging part of the imaging optical system, for reading an image of the original document on the surface of the original document. The illumination optical system includes an optical member having a light concentration effect and a plurality of reflective members. An area for disposing the member of the illumination optical system is divided into two areas by a virtual plane, which is perpendicular to the surface of the original document surface, parallel to the length direction and passes through the reading target area, and at least one of the reflective members is disposed in each of the areas.

First Embodiment

Figure 1:
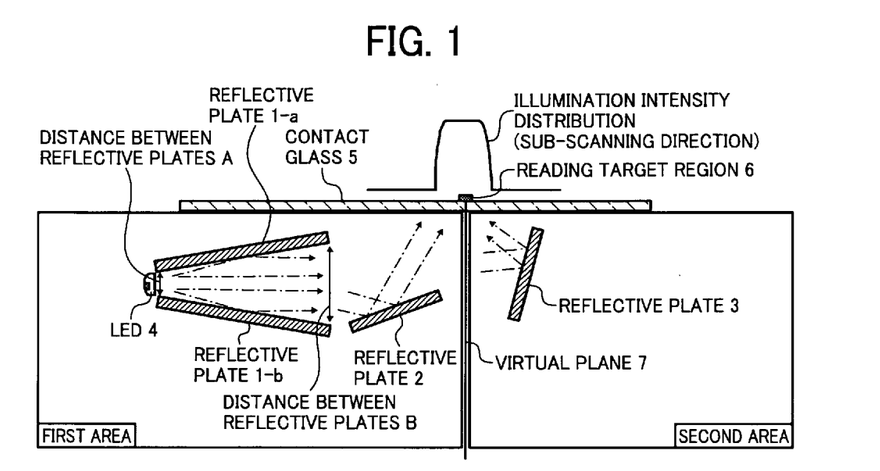
FIG. 1 is a cross-sectional diagram in a sub-scanning direction illustrating the constitution of a first embodiment according to an image reading apparatus of the present invention.
Figure 2:
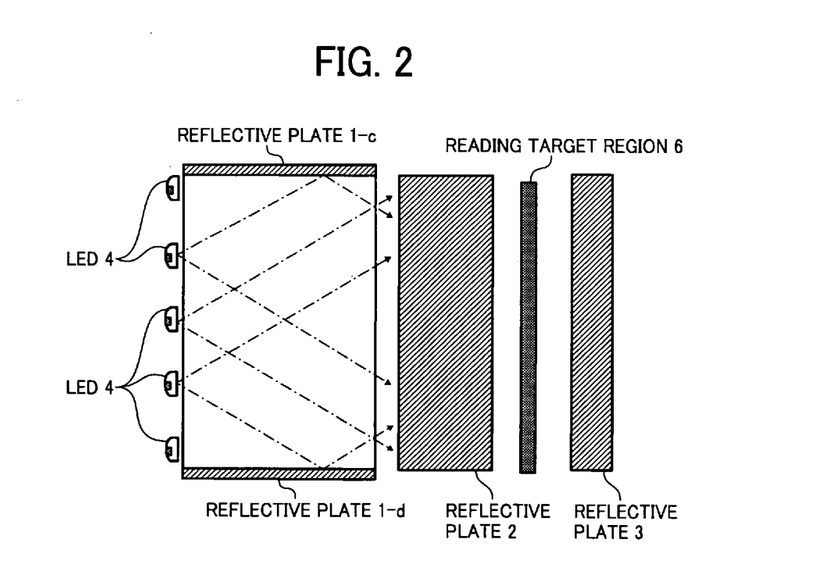
FIG. 2 is a cross-sectional diagram in a main-scanning direction illustrating the constitution of the first embodiment according to the image reading apparatus of the present invention.
Figure 3:
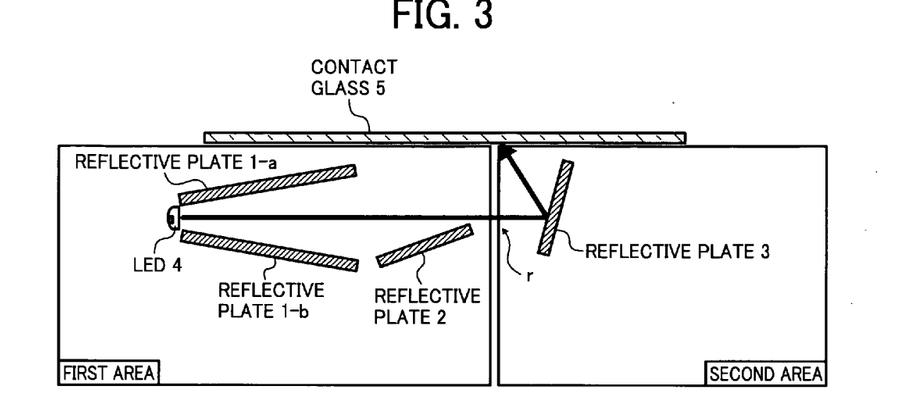
FIG. 3 is a schematic diagram illustrating the shortest distance r that light emitted from light-emitting diodes reaches a reading target area in the first embodiment according to the image reading apparatus of the present invention.

The constitution (cross-section in sub-scanning direction) of the first embodiment according to an image reading apparatus of the present invention is illustrated in FIGS. 1, 3. The constitution (cross-section in main-scanning direction) of the first embodiment of the image reading apparatus according to the present invention is illustrated in FIG. 2.

As illustrated in FIGS. 1, 2, a light source and an illumination optical system of the first embodiment have the following constitution.

(Light Source)
    LED 4 (×5 units)

(Illumination Optical System)
    Reflective Plate 1-a
    Reflective Plate 1-b
    Reflective Plate 1-c
    Reflective Plate 1-d
    Reflective Plate 2
    Reflective Plate 3

(Reflective Plate)

The reflective plates are all planes, and an optical member formed by the reflective plates 1-a, 1-b, 1-c, 1-d is integrated by an adhesive agent. In this case, the integrated reflective plates are called a light guiding body.

(Virtual Plane, First Area, Second Area)

In FIG. 1, a length direction is a direction perpendicular to the drawing and a width direction is a right to left direction in the drawing.

The virtual plane is a plane perpendicular to the surface of the original document and parallel to the length direction, and also is a surface which passes through a reading target area 6. More particularly, the virtual plane is defined as a plane through which the light reflected by the original document and utilized for imaging passes. In addition, when an area for disposing the light source and the member of the illumination optical system is divided by the virtual plane into two areas, the area in which the light source is provided is the first area and the area in which the light source is not provided is the second area.

FIG. 1 illustrates the specific example in the present embodiment of the present invention. In FIG. 1, the virtual plane denotes a line as the boundary of the first area and the second area. The LEDs 4, the optical member formed by the reflective plate 1-a, 1-b, 1-c, 1-d, and the reflective plate 2 are disposed in the first area and the reflective plate 3 is disposed in the second area.

In addition, in the following embodiments, the virtual plane, the first area, and the second area are used in the definitions similar to the definitions used in the present embodiment of the present invention. More specifically, in the following embodiments, the arrangement of the virtual plane 7, the first area, and the second area are similar to the arrangement in the preset embodiment of the present invention except that the type or the like of the optical member is changed.

(Constitution of Image Reading Apparatus)

In the sub-scanning direction, the light diffusing outward from the front face direction of the LEDs 4 of the light emitted from the LEDs 4 is effectively reflected and concentrated in the front face direction of the LEDs 4 by the reflective plate 1-*a* and the reflective plate 1-*b* opposed to each other parallel to the length direction. The reflective plate 1-*a* and the reflective plate 1-*b* opposed to each other are arranged to have an angle so that a distance B between the reflective plates on the side from which the light is emitted is larger than a distance A between the reflective plates on the side into which the light enters from the light source.

In contrast, in the main-scanning direction, since the optical effect is not provided for the light deviating toward the external side of the reflective plates 1-*a*, 1-*b* opposed to each other, the deviated light diffuses, but the deviated light is reflected by the reflective plate 1-*c* and the reflective plate 1-*d*, and effectively used for the illumination of the original document.

In this manner, the light emitted from the light guiding body formed by the reflective plate 1-*a*, 1-*b*, 1-*c*, 1-*d* is reflected by the reflective plate 2 in the first area to be led to the surface of the original document and also is reflected by the reflective plate 3 in the second area to be led to the surface of the original document.

In addition, the reflective plate 1-*a* and the reflective plate 1-*b* are preferably disposed to have an angle such that the light-emitting direction is parallel to the original document surface.

According to the above constitution, since the light-emitting direction is parallel to the surface of the original document, the light source and the optical member are disposed parallel to the surface of the original document. For this reason, the thickness (up and down direction in FIG. 1) in a direction perpendicular to the source of the original document of the light source and the illumination optical system member is reduced. As a result, the image reading apparatus is downsized.

In addition, a space required for diffusing the light emitted from the LEDs (for equalizing the illuminance unevenness of the main-scanning direction even with a small number of LEDs) is the front face direction of the light-emitting face of the LEDs (right and left direction in FIG. 1). As the present embodiment, when the light-emitting direction of the LEDs 4 is provided parallel to the surface of the original document (the upper surface of the contact glass 5 in FIG. 1), the light is captured in the sub-scanning direction by the light guiding body, and the light is picked up by the mirror, the image reading apparatus can be downsized in the up and down direction in FIG. 1. In addition, by increasing the number of LEDs to be more than 5, the image reading apparatus can be also downsized in the right to left direction in FIG. 2. At this moment, it becomes possible to achieve high illumination intensity. In addition, since the illumination from the two directions is implemented, the shadow does not appear even if a part of the original document is raised.

By adjusting the angle of the reflective plate while considering the light distribution of the LEDs 4, as shown in FIG. 1, the illumination intensity distribution in the sub-scanning direction is optimized. For example, adjustment can be made such that about 3 mm flat illumination intensity distribution can be obtained in the proximity of the reading target area 6. In this case, the degree of freedom of the design of the image reading apparatus is increased by letting the reflective plate have curvature, so that further desirable light quantity distribution can be formed.

In addition, when calculating a preferable value of an interval P between the light-emitting diodes in order that the illumination intensity does not have unevenness in the main-scanning direction in the reading target area 6, a distance r (the shortest distance that the light emitted from the light-emitting diodes passes through the optical member, is reflected by any of a plurality of reflective plates, and reaches the reading target area 6) is required. The distance r can be obtained by the route in FIG. 3 in the first embodiment.

The preferable value of the interval P between the light-emitting diodes without having the illumination unevenness can be obtained with the following formula 1 by using the obtained distance r.

$$P = 1.3 \cdot r \qquad \text{(formula 1)}$$

Figure 4:
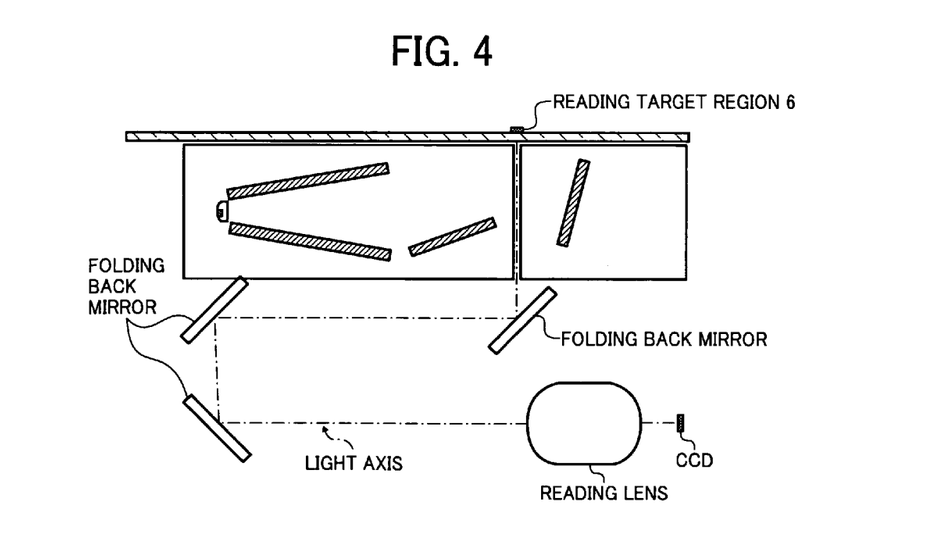
FIG. 4 is a schematic diagram illustrating a route from the reading target area to a CCD (charge-coupled device) in the first embodiment according to the image reading apparatus of the present invention.

FIG. 4 is a schematic diagram illustrating the route from the reading target area 6 to a CCD (charge-coupled device) of the first embodiment according to the image reading apparatus of the present invention. The light reflected by the reading target area 6 passes through the virtual plane 7, and is reflected by a plurality of folding back mirrors to be led to a reading lens. The light passing through the reading lens is led to the CCD, so that image information is read by the CCD.

(Image Forming Apparatus)

Figure 5:
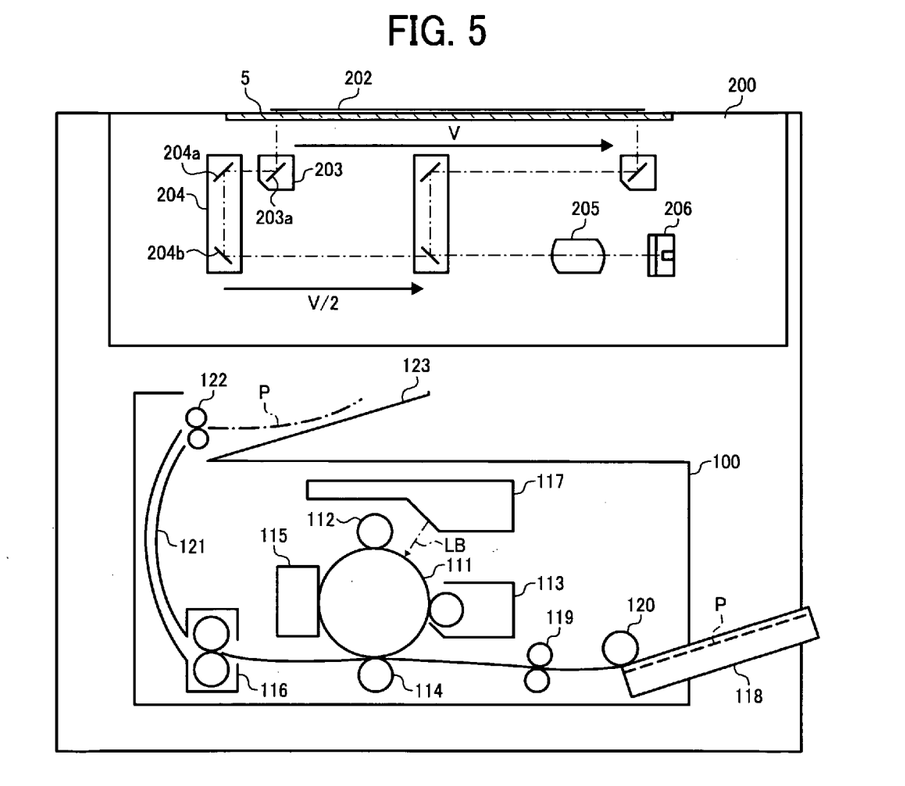
FIG. 5 is a schematic diagram illustrating a constitution of the first embodiment according to the image forming apparatus of the present invention.

FIG. 5 is a pattern diagram illustrating the image forming apparatus including the image reading apparatus according to the embodiment of the present invention.

In FIG. 5, symbol 100 indicates the image forming apparatus, 200 indicates the image reading apparatus. Other symbols are directly quoted in the description.

In the image reading apparatus 200, an original document 202 is placed on the contact glass 5, and the original document 202 is illuminated by an illumination part (not shown) disposed in a first running body 203 provided under the contact glass 5. The light reflected from the original document 202 is reflected by a first minor 203*a* of the first running body 203 and thereafter reflected by a first mirror 204*a* and a second mirror 204*b* of a second running body 204, so as to be lead to a reduced imaging lens 205, and imaged on a line sensor 206. In addition, in the case of a color image reading apparatus, the present invention can be applied with the same constitution by providing the line sensor 206 in each of the ROB colors.

In the case of reading the longitudinal direction of the original document, the first running body 203 moves in the right direction of FIG. 5 at velocity V, while the second running body 204 moves in the right direction at ½ V of the first running body 203, so that the optical path length from the original document 202 to the line sensor 206 is constantly maintained, and the original document in its entirety can be read with a certain magnification.

As the general usage method of LED in the original document illumination apparatus for use in the image reading apparatus, a large number of LED elements are arranged in an array.

The image forming apparatus 100 has a latent image carrier body 111 in a drum form, and has in the periphery thereof a charging roller 112 as a charging device, an image development device 113, a transfer roller 114 and a cleaning device 115. A "corona charger" can be used as the charging device. Furthermore, a light scanning device 117 such as an image reading part is provided in the image forming apparatus 100, so as to perform light scanning by a laser beam LB upon reception of original document information from external parts. Exposure by optical writing is conducted between the charging roller 112 and the image development device 113.

When performing image formation, the latent image carrier body 111 of a photoconductive photoreceptor is rotated clock-wise at a constant velocity. The surface of the latent image carrier body 111 is electrically charged uniformly by the charging roller 112, and an electrostatic latent image is formed by the exposure by the optical writing of the laser beam LB of the light scanning device 117. The formed electrostatic latent image includes a so-called negative latent image wherein an image area is exposed and a so-called positive latent image wherein a non-image area is exposed. Any of the above electrostatic latent images is visualized by using toner for development of an electrostatic latent image in the development device 113. In this case, an image forming apparatus capable of forming a color image can be obtained by providing a total of 4 development devices 113 relative to each of the four colors YMCK.

A cassette 118 for storing sheets of transfer paper P is detachably provided in the main body of the image forming apparatus 100. In the attached state as shown by FIG. 5, the stored top transfer paper P is fed by a paper feeding roller 120. The tip part of the fed transfer paper P is caught by a resist roller pair 119. The resist roller pair 119 sends the transfer paper P to the transfer portion at the timing such that the toner image on the latent image carrier body 111 is moved to the transfer position. The sent transfer paper P is superimposed with the toner image in the transfer portion and by the effects of transfer roller 114, the toner image is electrostatically transferred. The transfer paper P transferred with the toner image is sent to a fixing device 116 and the toner image is fixed in the fixing device 116. The transfer paper passes through a paper feeding path 121, and is discharged onto a tray 123 by a paper discharging roller pair 122. The surface of the latent image carrier body 111 after the transfer of the toner image is cleaned by the cleaning device 115, thereby residual toner, paper powder or the like is removed.

Second Embodiment

Figure 6:
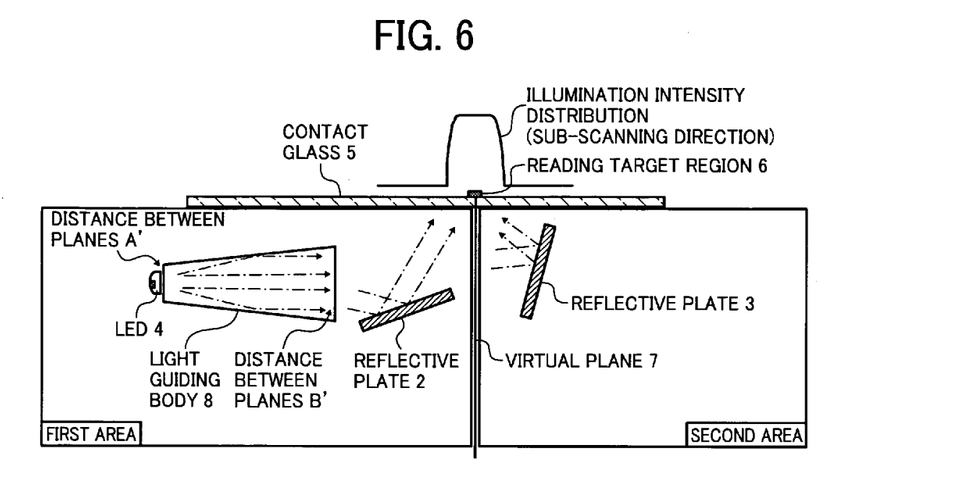
FIG. 6 is a cross-sectional diagram in a sub-scanning direction illustrating the constitution of a second embodiment according to the image reading apparatus of the present invention.
Figure 7:
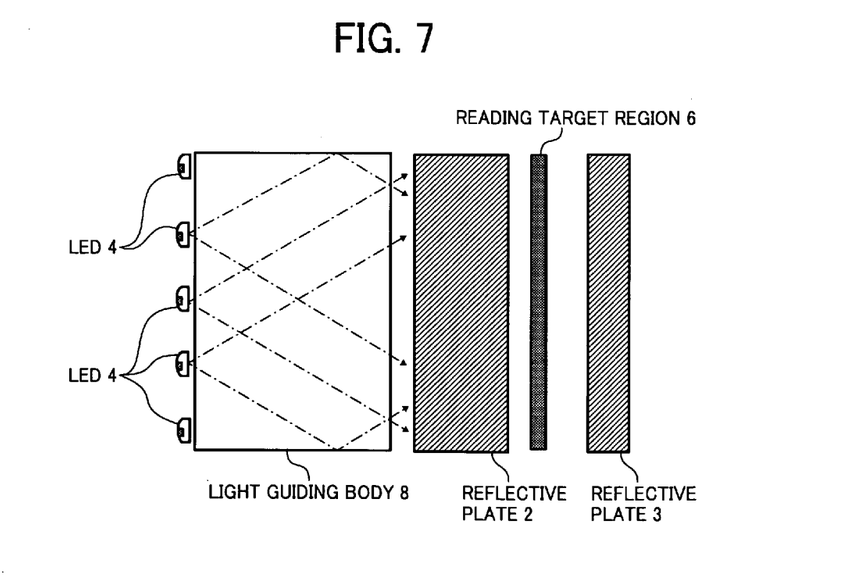
FIG. 7 is a cross-sectional diagram in a main-scanning direction illustrating the constitution of the second embodiment according to the image reading apparatus of the present invention.
Figure 8:
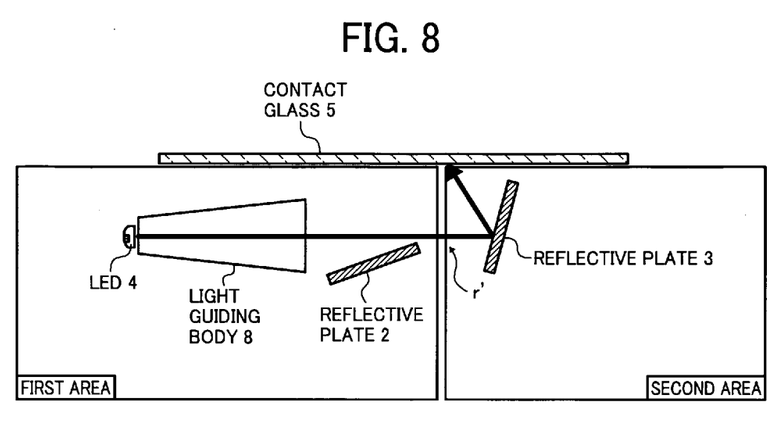
FIG. 8 is a schematic diagram illustrating the shortest distance r' that light emitted from light-emitting diodes reaches a reading target area in the second embodiment according to the image reading apparatus of the present invention.

The constitution of the second embodiment (cross-section in sub-scanning direction) according to the image ruling apparatus of the present invention is illustrated in FIGS. 6,8. The constitution of the second embodiment (cross-section in main-scanning direction) according to the image reading apparatus of the present invention is illustrated in FIGS. 4, 7.

In addition, as shown in FIG. 6 and FIG. 7, the constitution of an optical illumination system and a light source of the second embodiment is as follows.
(Light Source)
    LED 4 (×5 units)
(Illumination Optical System)
    Light guiding body 8
    Reflective plate 2
    Reflective plate 3
(Reflective Plate, Light Guiding Body)

The reflective plates are all planes, and the constitution of the second embodiment is the same as the first embodiment except for the light guiding body 8. The difference of the light guiding body 8 between the first embodiment and the second embodiment is described hereinbelow.

In the light guiding body of the first embodiment, since mirror surface finishing is generally performed to the reflective surfaces of the inexpensive reflective plates with aluminum coating or the like, the degree of the reflection is approximately 90% with visible light rays. In comparison, the light guiding body 8 of the second embodiment is formed from a material such as a glass or a plastic, and utilizes total reflection of light. Therefore, the degree of reflection is nearly 100%. In this case, the reflective surface of the light guiding body 8 of the second embodiment is applied with a mirror surface state having less roughness by implementing polishing processing, so that the degree of reflection further approaches 100%. If the reflective surface has a rough surface, the loss in the surface becomes larger. It is desirable for the light guiding body 8 to be made of a plastic rather than a glass because the processing is easier and the weight of the light guiding body 8 is reduced.

In addition, the light guiding body 8 of the second embodiment is formed from 6 planes. The incident face of light (the closest face to the LEDs 4 in FIG. 6) and the emitting face of light (the closest face to the reflective plate 2 in FIG. 6) do not utilize the total reflection of the light. Because the incident face of light and the emitting face of light are faces to perform the incidence and emission of light, they are not limited to the planes as long as they have a surface shape having high efficiency of light use. Therefore, the light guiding body 8 has at least 4 planes that utilize total reflection.

Two planes within the four planes are disposed to be opposed to each other. The two planes disposed to be opposed to each other are arranged such that a distance B' between the planes on the side from which the light is emitted is larger than a distance A' between the planes on the side into which the light enters from the light source.

In addition, the two planes disposed to be opposed to each other are preferably disposed to be parallel to the length direction.

By the above constitution, in the sub-scanning direction, the light diffusing outward from the front face direction of the LEDs 4 of the light emitted from the LEDs 4 is effectively reflected and concentrated in the front face direction of the LEDs.

Furthermore, except the two planes disposed to be opposed to each other within the four planes, the rest of the two planes are preferably disposed to be parallel to the length direction and perpendicular to the surface of the original document. In the main-scanning direction, by the above constitution, the light deviating toward the outside of the two planes disposed to be opposed to each other is reflected, so as to be efficiently used for the illumination of the original document.

In addition, when calculating a desirable value of an interval P' between light-emitting diodes, distance r' (the conversion distance represented by the following formula 3) is required.

$$r' = r - \Sigma\{Di \cdot (1 - 1/Ni)\} \qquad \text{(formula 3)}$$

The distance r' can be calculated from the route of FIG. 8 of the second embodiment. Using the calculated distance r', a desirable value of an interval P' between light-emitting diodes without having illuminance unevenness can be calculated with the following formula 2.

$$P' = 1.3 \cdot r' \qquad \text{(formula 2)}$$

In this case, it differs from the first embodiment in that the light passes through a medium (light guiding body 8) having a refraction index. The distance r' can be calculated by the formula 3 from the refraction index of the light guiding body 8 and the route of FIG. 4.

Third Embodiment

Figure 9:
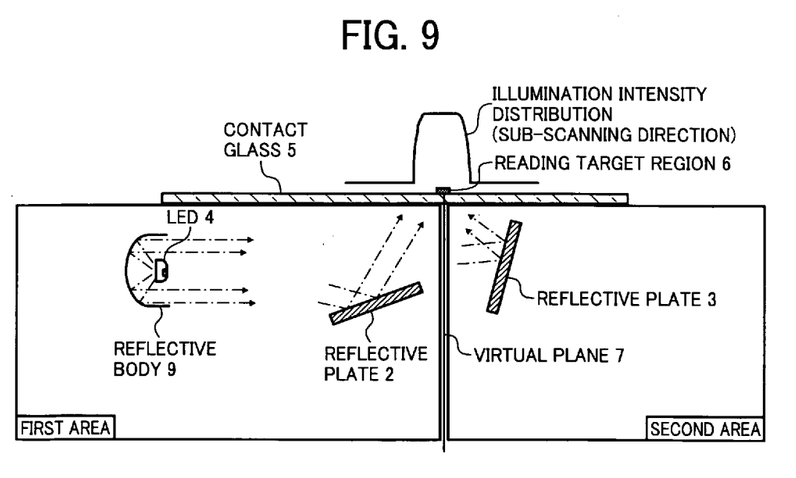
FIG. 9 is a cross-sectional diagram in a sub-scanning direction illustrating the constitution of a third embodiment according to an image reading apparatus of the present invention.

The constitution of the third embodiment (cross-section in sub-scanning direction) according to the image reading apparatus of the present invention is illustrated in FIG. 9. The constitution of the third embodiment (cross-section in main-scanning direction) according to the image reading apparatus of the present invention is illustrated in FIG. 10.

Figure 10:
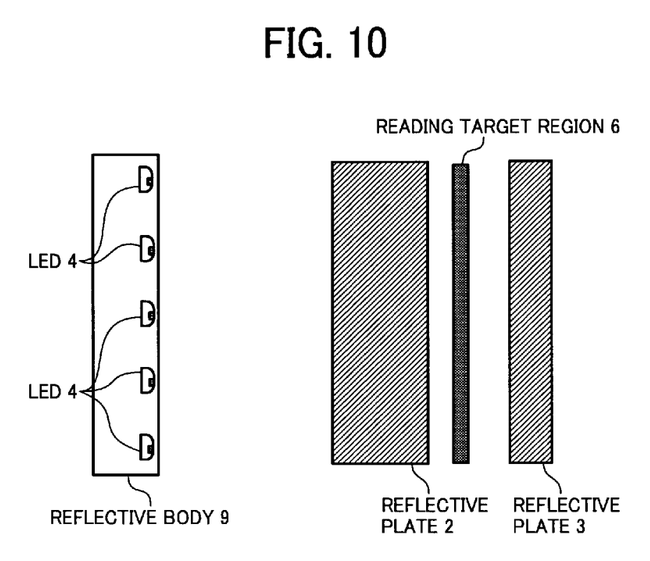
FIG. 10 is a cross-sectional diagram in a main-scanning direction illustrating the constitution of the third embodiment according to the image reading apparatus of the present invention.

In addition, as illustrated in FIG. 9 and FIG. 10, the constitution of a light source and an optical illumination system of the third embodiment is as follows.

(Light Source)
  LED 4 (×5 units)
(Optical Illumination System)
  Reflective body 9
  Reflective plate 2
  Reflective plate 3
(Reflective Plate, Reflective Body)

The reflective plates are all planes. They are the same constitution as the first embodiment except for the reflective body 9. Since the function of the reflective body 9 is the same as the light guiding body of the first embodiment, the reflective body 9 is explained hereinbelow.

The reflective body 9 has curvature in the sub-scanning direction. It has a cylindrical plane without having curvature in the main-scanning direction. The shape of the curved surface is a spherical surface or a paraboloidal surface. The reflective body has the effect of turning the outgoing light from the LEDs 4 into approximate parallel light in the sub-scanning direction.

Fourth Embodiment

Figure 11:
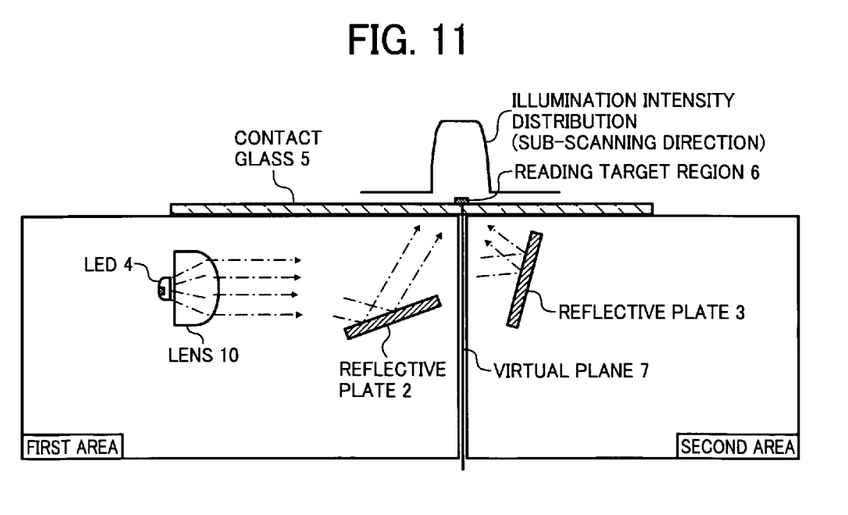
FIG. 11 is a cross-sectional diagram in a sub-scanning direction illustrating the constitution of a fourth embodiment of an image reading apparatus according to the present invention.

The constitution of the fourth embodiment (cross-section in sub-scanning direction) according to the image reading apparatus of the present invention is illustrated in FIG. 11. The constitution of the fourth embodiment (cross-section in main-scanning diction) according to the image reading apparatus of the present invention is illustrated in FIG. 12.

Figure 12:
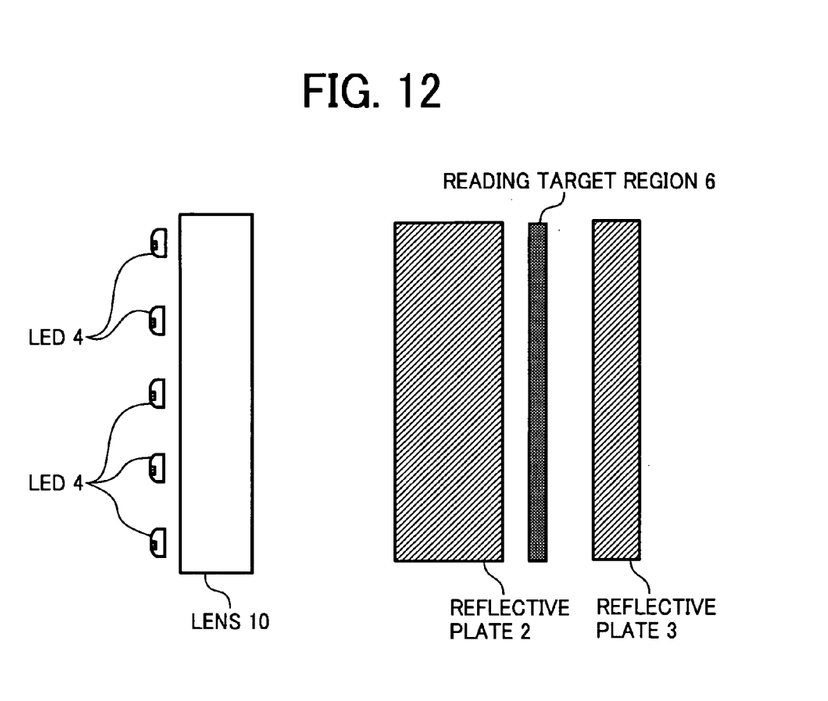
FIG. 12 is a cross-sectional diagram in a main-scanning direction illustrating the constitution of the fourth embodiment according to the image reading apparatus of the present invention.

In addition, as shown in FIG. 11 and FIG. 12, the constitution of the light source and the illumination optical system of the fourth embodiment are as follows.
(Light Source)
  LED 4 (×5 units)
(Illumination Optical System)
  Lens 10
  Reflective plate 2
  Reflective plate 3
(Reflective Plate, Lens)

The reflective plates are all planes. They are the same constitution as the first embodiment except for the lens 10. Since the function of the lens 10 is the same as the light guiding body of the first embodiment, the lens 10 is explained hereinbelow.

The lens 10 has curvature in the sub-scanning direction. It has a cylindrical surface without having curvature in the main-scanning direction. The shape of the curved surface is a spherical surface or a paraboloidal surface. The lens 10 has the effect of turning the light emitted from LEDs 4 into approximate parallel light in the sub-scanning direction.

Fifth Embodiment

The fifth embodiment is an embodiment in which only the constitution of the optical illumination system in the first embodiment is changed. The constitution of a side reflective plate and the effects thereof are explained in detail based on the constitution of the fifth embodiment illustrated in FIG. 13 and FIG. 14.

Figure 13:
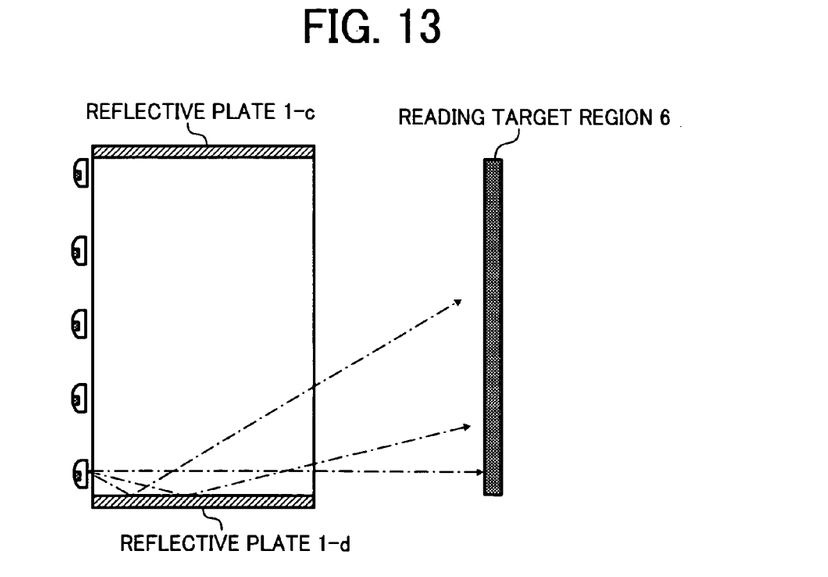
FIG. 13 is a cross-sectional diagram in a main-scanning direction illustrating the constitution of an illumination optical system which is a part of constitution of a fifth embodiment according to the image reading apparatus of the present invention.

In order to clarify the effect of a side reflective plate (reflective plate 1-$d$), in FIG. 13, the reflective plates 2, 3 are abbreviated from the constitution of the image reading apparatus in FIG. 2. However, in the present embodiment, the apparatus includes the reflective plates 2, 3 as illustrated in FIG. 2 although they are omitted in FIG. 13.

As shown in FIG. 13, the light emitted from the LEDs, which spreads toward the main-scanning direction, is reflected by the side reflective plate (reflective plate 1-$d$). It is thereby led to the reading target region to be effectively utilized as the illumination light.

Figure 14:
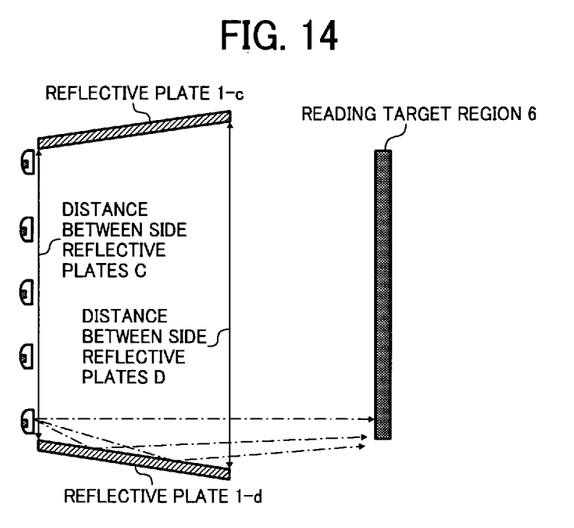
FIG. 14 is a cross-sectional diagram in the main-scanning direction illustrating the constitution of a deformation example of the illumination optical system which is a part of the constitution of the fifth embodiment according to the image reading apparatus of the present invention.

FIG. 14 is an example of further functional utilization of the side reflective plate (reflective plate 1-$d$). As shown in FIG. 14, the reflective plate 1-$c$ (side reflective plate) and the reflective plate 1-$d$ (side reflective plate) disposed to be opposed to each other are arranged to have an angle such that a distance C between the side reflective plates on the side into which the light enters from the light source and a distance D between the side reflective plates on the side from which the light is emitted includes a relationship of C<D.

The reflective plate 1-$c$ and the reflective plate 1-$d$ are not disposed to be opposed to each other in an arrangement relationship parallel to the front face. Two effects can be obtained by disposing the opposed reflective plate 1-$c$ and the reflective plate 1-$d$ to have an angle. One is that loss by the reflection of light on the contact glass surface lessens because the angle of light entering to the reading target area onto which the contact glass is firmly attached becomes close to perpendicular (the glass surface has a property to reflect a portion of the incident light. Generally, as the angle of incident light onto the glass surface becomes sharper, the reflective light quantity on the contact glass surface increases and the illumination efficiency (light use efficiency) drops). Therefore, the efficiency of light emitted from the LEDs utilized as the illumination light for reading, that is, the improvement in the light use efficiency can be expected. The other is that by adjusting an angle, as shown in FIG. 14, the improvement in the light quantity of the edge portion of the reading target region can be expected.

Sixth Embodiment

Figure 15:
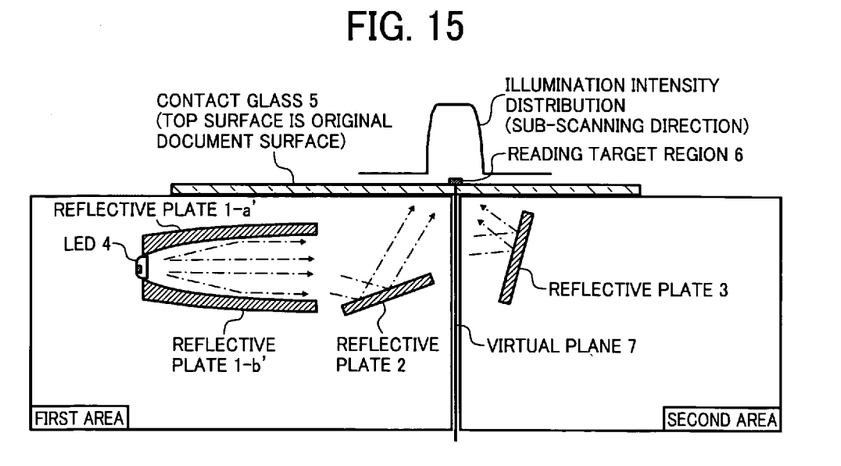
FIG. 15 is a cross-sectional diagram in a sub-scanning direction illustrating the constitution of a sixth embodiment according to the image reading apparatus of the present invention.
Figure 16:
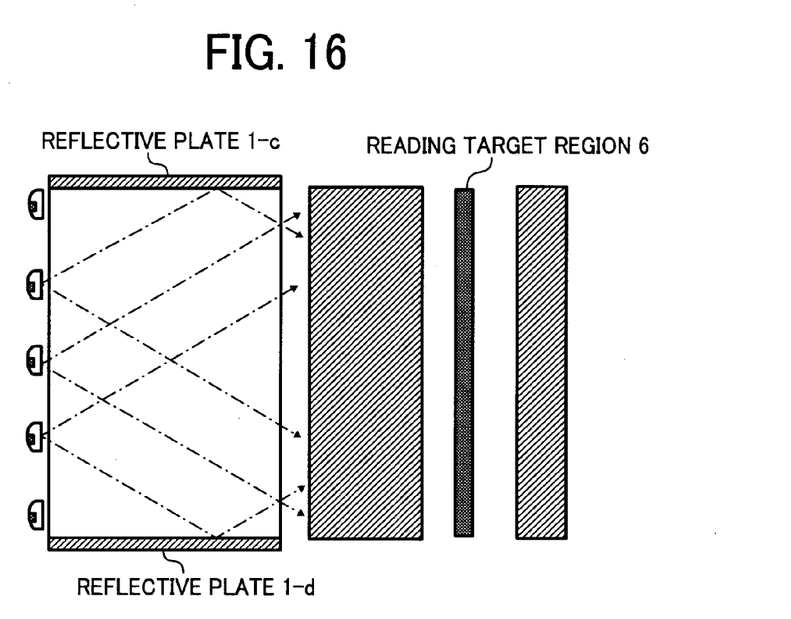
FIG. 16 is a cross-sectional diagram in a main-scanning direction illustrating the constitution of the sixth embodiment according to the image reading apparatus of the present invention.

The constitution of the sixth embodiment (cross-section in sub-scanning direction) according to the image reading apparatus of the present invention is illustrated in FIG. 15. The constitution of the sixth embodiment (cross-section in main-scanning direction) according to the image reading apparatus of the present invention is illustrated in FIG. 16.

In the sixth embodiment, the shape of reflective plates 1-$a'$, 1-$b'$ disposed to be opposed to each other in the first embodiment is configured to a parabolic state. The reflective plates are of the parabolic state in the length direction and do not have curvature in the width direction. As it is clear from FIG. 15, the reflective plates are in the parabolic state on cross-section in the sub-scanning direction. By placing a light source on the focal point of the paraboloidal surface or in the vicinity thereof, the light emitted from the light source and reflected by the reflected surface becomes approximate parallel light.

Figure 17:
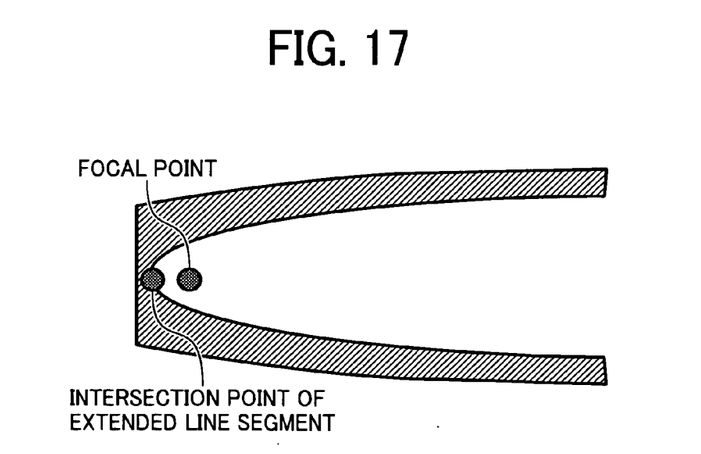
FIG. 17 is a schematic diagram illustrating opposed reflective plates having a parabolic form in the sixth embodiment according to the image reading apparatus of the present invention.

FIG. 17 is a view that elongates and crosses a line segment of the reflective surface on the cross-section in the sub-scanning direction. The focal point of the parabola is naturally closer to the light-emitting direction (closer to the right side of the FIG. 17) rather than the intersecting point of the line segment, so that the light source is disposed closer to the light-emitting direction rather than the intersecting point of the line segment.

If the reflective surfaces are turned into the parabolic state like the fifth embodiment, the light emitted from the light source becomes further closer to parallel light in comparison to the first embodiment. For this reason, although the light use efficiency increases, the manufacturing cost of turning the reflective surface into the parabolic state increases in comparison to a plane. Therefore, in consideration of the manufacturing cost, there are cases wherein a method to dispose a plane in an angle similar to a parabola is applied.

Moreover, based on the technical idea of turning the reflective surfaces of the opposed reflective plates of the present embodiment into the parabolic state, it is possible to turn the reflective surfaces of the light guiding body into the parabolic state. It is confirmed that the light guiding body using the reflective surfaces of the parabolic state can attain the same effects as the present embodiment.

Furthermore, by combining the technical idea relating to the arrangement configuration of the side reflective plate of the fifth embodiment with the invention of turning the reflective surfaces of the light guiding body into the parabola state, the improvement in the light use efficiency can be attained. That is to say, the side planes are disposed per plane to be opposed to each other on the both edge parts of the length direction of the two planes opposed to each other. The pair of side planes disposed to be opposed to each other is arranged to have an angle such that a distance C' between the side reflective planes on the side from which the light is emitted and a distance D' between the side planes on the side into which the light enters from the light source includes a relationship of C'<D'.

Seventh Embodiment

Figure 18:
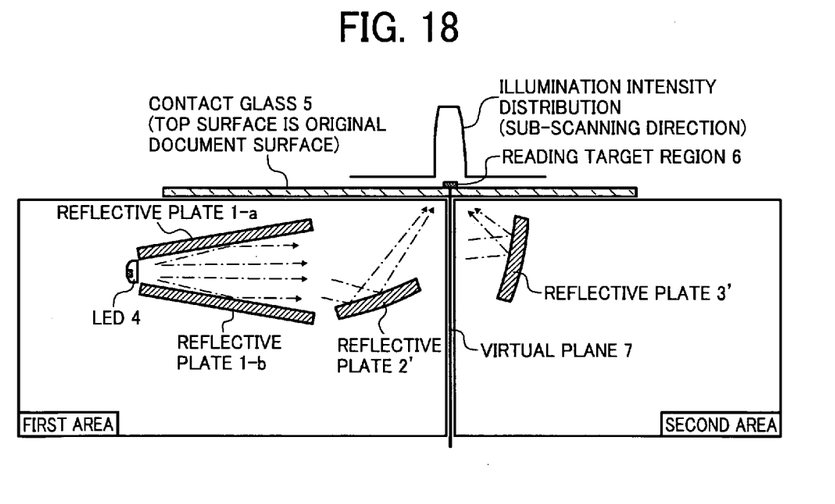
FIG. 18 is a cross-sectional diagram in a sub-scanning direction illustrating the constitution of a seventh embodiment according to an image reading apparatus of the present invention.

The configuration of the seventh embodiment (cross-section in sub-scanning direction) according to the image reading apparatus of the present invention is illustrated in FIG. 18. In the seventh embodiment, the reflective plate 2 and the reflective plate 3 of the first embodiment are changed into curved surfaces as a reflective plate 2' and a reflective plate 3'. By turning the reflective plates into the curved surfaces, the light concentration effects shared by only the reflective plates 1-a and 1-b of the first embodiment can now also be shared by the reflective plate 2' and the reflective plate 3'. The illumination intensity improvement of the reading target area can be expected.

However, by adopting such a configuration, in the illumination intensity distribution in the sub-scanning direction, the uniformed illumination area narrows. For this reason, if the illumination region and the reading target region are misaligned by manufacturing errors or the like, there is a concern that illumination intensity of the reading target region falls dramatically. But when the manufacturing process is in a stable state and there is no need for such a concern, the configuration of the seventh embodiment is desirable.

By the image forming apparatus and the image reading apparatus of the first to the seventh embodiments, the occurrence of the shadow portion by the raising of the original document surface can be prevented, and also the downsized image forming apparatus and the image reading apparatus having high light use efficiency without weakening the degree of light concentration are provided.

The present invention can prevent the occurrence of the shaded part by the raising of the original document surface whilst it is still possible to constitute a downsized optical illumination system with high light use efficiency that does not weaken the degree of light concentration.

While preferred embodiment of the invention has been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image reading apparatus, comprising:
a plurality of light sources arranged in a predetermined one direction; and
an optical member to guide light emitted from the light sources to a reading target area of an original document surface, the optical member including a first reflective surface and a second reflective surface which are disposed to oppose each other at an angle, and the first reflective surface and the second reflective surface being planes; and
wherein the optical member is a light guiding body having at least four planes comprising glass or an optical plastic, two planes within the four planes are disposed to be opposed to each other, and the two planes disposed to be opposed to each other are arranged to have a distance B' between the planes on a side from which the light is emitted larger than a distance A' between the planes on a side into which the light enters from the light sources;
wherein the two planes disposed to be opposed to each other concentrate light diffusing in the perpendicular direction relative to the original document surface within the light emitted from the light sources;
wherein the light guiding body has side planes on edge parts of a length direction of the two planes disposed to be opposed to each other; and
wherein the side planes are disposed to be opposed to each other on both edge parts of the length direction of the two planes disposed to be opposed to each other, and the pair of opposed side planes is arranged to have a distance D' between the side planes on a side from which the light is emitted larger than a distance C' between the side planes on a side into which the light enters from the light sources.

2. The image reading apparatus according to claim 1, wherein each of the light sources is a light-emitting diode.

3. The image reading apparatus according to claim 1, wherein the angle between the first reflective surface and the second reflective surface is set such that the light emitted from the optical member is parallel with the original document surface.

4. The image reading apparatus according to claim 1, further comprising a plurality of reflective members to reflect the light emitted from the optical member, wherein, when an area for disposing the optical member is divided into two areas by a virtual plane which is perpendicular to the original document surface and parallel with a length direction of the reflective members, and passing through the reading target area, at least one of the plurality of reflective members is disposed in each of the areas.

5. The image reading apparatus according to claim 2, wherein the light-emitting diode is a one chip type white color light-emitting diode using a fluorescent substance.

6. The image reading apparatus according to claim 2, wherein the light emitting diode is a white color light emitting diode that emits a white color by a mixed color by using two or more types of chips each having a different light-emitting color.

7. The image reading apparatus according to claim 2, wherein the reflective surfaces concentrate light diffusing in a perpendicular direction relative to the original document surface within the light emitted from the light sources.

8. The image reading apparatus according to claim 7, wherein the opposed side planes concentrate light diffusing in the length direction within the light emitted from the light sources.

9. The image reading apparatus according to claim 8, wherein the light guiding body is treated with polishing processing on each plane.

\* \* \* \* \*